Patented Dec. 26, 1950

2,535,644

UNITED STATES PATENT OFFICE 2,535,644

STABILIZED SOIL ROAD AND METHOD OF PRODUCING SAME

George E. Martin, New Rochelle, N. Y., assignor to Allied Chemical & Dye Corporation, New York, N. Y., a corporation of New York No Drawing. Application October 10, 1947, Serial No. 779,221

9 Claims. (Cl. 94—23)

This invention relates to soil stabilization and to the resultant stabilized soil product.

Local conditions of traffic and of economic necessity result in the use of relatively low cost roads made from local materials. Such roads now constitute a large proportion of the highway system of this country. They are made from soil occurring in the neighborhood of the roadway; such soils consist chiefly of sand, silt and clay, but may contain a varying amount of coarser material such as gravel and more or less organic matter. By the expression "soil" as used herein is meant mineral matter produced by the natural or artificial disintegration of rock substances and consisting of varying proportions of sand, silt and clay and coarser particles with dimensions larger than 2 mm. By "sand" is meant the portion of the soil which has a particle size of between 2.0 and 0.05 mm. in diameter. By "silt" is meant the portion of the soil having a particle size of between 0.05 and 0.005 mm. in diameter. By "clay" is meant the portion of soil having a particle size less than 0.005 mm. in diameter. Clay may contain a substantial proportion of particles having a size less than 0.001 mm. in diameter, which is commonly referred to as "colloidal clay."

In order to reach a proper understanding of this invention it is important to distinguish between soil, on the one hand, and mineral aggregate, on the other. Mineral aggregate is usually prepared by disintegrating rock formations to produce particles which may be graded according to size or by screening natural deposits of disintegrated rocks. The average size of particles comprising mineral aggregate is much larger than the average size of soil particles. The present invention is concerned with the stabilization of soils utilizing the bonding properties of the clay and silt constituents of the soil and is thus distinguished from the bonding of mineral aggregate particles by the application of bituminous binder thereto, which has long been the practice in the construction of roadways.

As pointed out by the United States Department of Agriculture in a publication entitled "Public Roads" for November 1927, vol. 8, No. 9, the application of bitumen to top soil in quantity sufficient to form a mixture which is rich in bitumen so that the bitumen acts as a binder for the soil particles and seals the compacted soil against the ingress of moisture in many cases is unsatisfactory, because the resultant mixture when subjected to traffic conditions tends to become displaced. It was found that the use of a lean mixture of bitumen and soil, in which the amount of bitumen was insufficient to thoroughly coat the grains or particles of the soil and the bond was derived in part from the clay, resulted in a more stable mixture. In preparing such bituminous-soil mixtures, coal tar and water gas tar have been mixed with the soil for stabilization purposes. Coal tar and water gas tar, as is well known, are preferred to other bituminous materials such as asphalt because they are more resistant to the action of water, and to the action of decay and other deteriorating influences. Further, such tars mix readily with soils, adhere to the particles thereof, retain their adhesive properties even in the presence of water, tend to remain where placed in the base or surface courses of a road or similar structure, and can be mixed with the soil even when the soil is very wet.

It is an object of the present invention to increase the resistance to displacement of soils stabilized with tar, particularly coal tar or water gas tar, without detrimentally affecting other desirable properties of the soil so stabilized. Another object of this invention is to provide a method of preparing a soil road of improved stability and durability. Other objects and advantages of this invention will appear from the following detailed description.

I have found that by mixing with soils stabilized or to be stabilized by the addition of tar without impairing the binding properties of the clay and silt constituents of the soil, a controlled limited amount of powdered pitch, particularly coal tar or water-gas tar pitch, solid at atmospheric temperature conditions encountered in use, including summer temperatures, a stabilized soil road results, surprisingly more resistant to displacement under traffic conditions. The powdered pitch used should have a melting point, cube in air, of from 200° F. to 430° F., preferably from about 225° F. to about 325° F., and a particle size such that 100% passes a No. 10 sieve and at least 20% passes a No. 200 sieve. Preferably at least 75% should pass a No. 40 sieve and at least 30% should pass a No. 200 sieve. In the embodiment of the invention hereinafter described, coal tar pitch having a melting point of 308° F. cube in air and a free carbon content of 43.5% was employed. The particle size of this pitch was such that all of it passed a No. 10 sieve and at least 50% passed a No. 200 sieve.

Pulverized pitches having relatively low melting points, such as from about 200° F. to about 300° F. have a tendency to agglomerate after pulverization, particularly in warm weather and in storage, and when exposed to the heat of the sun. The effect of this tendency depends on melting point of the pitch, the range of and time of exposure to temperatures above a critical temperature, and conditions prevailing during storage and shipment to point of use. With pitches of low melting point, therefore, it is often desirable to prevent agglomeration of the pulverized pitch by mixing with it a controlled amount of earthy material such as clay, rock dust, rock screenings, fine sand or similar material which may be intimately mixed with the pulverized pitch to maintain it in readily dispersible condition. Usually 5% to 50% of such added material, based on the weight of the mixture, will be adequate for the purpose. The proportion of such added material will depend on the fineness and character of the added material. Incorporation of moisture in the mixture, in an amount which will not be objectionable when handling and manipulating the pulverized pitch in manufacture, packaging, shipment and use will also assist in maintaining the material in readily dispersible condition. Other means of maintaining pitch in particulate condition, such as treatment with waxes, gums, resins, starch or hydrophilic colloids, may be employed.

The amount of coal tar pitch used to stabilize the soil in accordance with this invention should not exceed 125% based on the weight of the tar used. In general, from 10% to 100% powdered pitch based on the amount of tar added to the soil may be employed. The amount of tar added to the soil may vary from 2% to 10% based on the weight of the soil. It will be understood that within the limits above indicated the amount of pitch and tar may vary, depending upon the characteristics of the soil treated. Thus, for a soil having a relatively high sand content, a smaller silt content, and a still smaller clay content, about 5% tar and 0.5% to 2.5% pitch based on the weight of the soil was found satisfactory for stabilizing the soil. In stabilizing a soil having a high silt content, a smaller clay content and very little sand, it was found necessary to use from 6% to 9% tar with from 2.5% to 6% pitch based on the weight of the soil for stabilizing such soil.

The tar used in practicing my invention may be any of the grades of road tar derived from coal tar, water gas tar or similar tars including petroleum tars as used in highway construction and maintenance and as exemplified by tentative specifications for tar of the American Society for Testing Materials, A. S. T. M. Designation D490–43T; coal tars and water gas tars are preferred. For the stabilization of soils it is usual to employ tar products having a consistency within the range represented by a specific viscosity, Engler, of about 5 at 40° C. and a float test of 200 seconds at 32° C. The particular grade of tar selected for stabilization of a soil will depend on type and grading of the soil and on temperature and other conditions prevailing during construction of the stabilized soil base or surfacing. For treatment of most of the soils stabilized in American practice, a suitable tar may be selected from the tars the properties of which are given in the following table:

| Tar | 1 | 2 | 3 | 4 | 5 |
|---|---|---|---|---|---|
| Water by volume maximum per cent | 2 | 2 | 1.5 | 1.5 | 1 |
| Specific gravity at 25°/25° C. minimum | 1.09 | 1.09 | 1.10 | 1.10 | 1.12 |
| Specific viscosity Engler 50 cc. at: | | | | | |
| 40° C | 13 to 22 | 22 to 35 | | | |
| 50° C | | | 17 to 26 | 26 to 40 | |
| Float test seconds 32° C | | | | | 50 to 80 |
| Distillation test on water-free material—Total distillate by weight percent to: | | | | | |
| 170° C | 7 max. | 5 max. | 5 max. | 5 max. | 3 max. |
| 270° C | 30 max. | 30 max. | 25 max. | 25 max. | 20 max. |
| 300° C | 40 max. | 40 max. | 35 max. | 35 max. | 30 max. |
| Softening Point (Ring and Ball Method) of residue from distillation ° C | 35 to 65 | 35 to 65 | 35 to 70 | 35 to 70 | 35 to 70 |
| Total bitumen soluble in carbon disulfide by wgt. minimum percent | 88 | 88 | 83 | 83 | 78 |

The pitch used may be made by distilling coal tar or water gas tar to produce pitches having a melting point, cube in air, of at least 200° F. and preferably from 225° F. to 325° F. Pitches having such melting point prepared by blowing tar or soft pitch or by fluxing hard pitch with a suitable flux may also be used. The pitch should be ground or otherwise disintegrated and pulverized so that it has a particle size conforming with the following screen analysis:

| | Per cent |
|---|---|
| Passing a No. 10 sieve | 100 |
| Passing a No. 200 sieve, not less than | 20 | and preferably:

| | |
|---|---|
| Passing a No. 10 sieve | 100 |
| Passing a No. 40 sieve, not less than | 75 |
| Passing a No. 200 sieve, not less than | 30 |

In practicing this invention the existing soil to be employed for making the base of the road should be loosened to the depth necessary to provide the required thickness. This may be done with a scarifier, blade grader, plow or other machine, as well known to the art. Alternatively soil from any convenient source may be distributed on the foundation, or soil from an outside source may be added to the soil loosened from the foundation of the road and the resultant soil mixture loosened as above described. Sand, stone screenings, gravel or other aggregate may be added to the soil to improve the quality thereof in the area to be stabilized. The soil mixture should be pulverized; this may be accomplished by the use of a disc harrow, spring-tooth harrow, or blade grader. If the soil is very dry it may be advisable to add some water to assist in the pulverizing operation. For this purpose water may be applied with any convenient sprinkling apparatus. Coal tar or water gas tar is applied to the surface of the soil in liquid condition by means of a pressure distributor. The amount of tar thus applied, depending upon the character of the soil, as above indicated, may be from 2% to 10% of the weight of the soil. Powdered pitch in amount of from 10% to 100% based on the weight of tar is added before, simultaneously with or after, the addition of the tar to the soil. Intimate mixture of the constituents may be effected by placing the pulverized soil in a windrow, leaving some of the loose soil on the subgrade of the road foundation, distributing the tar and powdered pitch over the loose soil, spreading an additional layer of loose soil from the windrow over the tar and pitch, applying tar and powdered pitch to the second layer of loose soil and repeating these operations until all the soil has been spread from the windrow and the required amount of tar and pitch mixed therewith.

The order of mixing soil, water, tar and pitch is not important and may be changed from time to time to meet construction and weather conditions, or as may be convenient during construction operations. When making the mixture on the highway it is usually preferred to moisten the soil first, the moisture content being adjusted subsequently as is frequently necessary after rain or during dry weather, and thereafter add the coal tar or water gas tar and the powdered pitch, mix as thoroughly as possible and consolidate the mixture.

An alternate method of effecting intimate mixture of the tar, powdered pitch and soil, is to distribute the soil evenly over the entire width of the proposed roadway; portions of tar and powdered pitch are then successively applied to the surface of the soil, and following each application of the powdered pitch and tar, the mixture mixed as thoroughly as possible, for example, by means of a disc harrow. The amounts of tar and powdered pitch thus added should be such that when all the tar and pitch has been mixed with the soil the amount based on the weight of the soil will come within the limits hereinabove specified.

The tar, powdered pitch and soil may also be mixed by means of a traveling plant, usually of the pug mill type. The powdered pitch is first added to the soil. The soil and powdered pitch are then passed through the mixing machine where the tar is added. The mixture is then spread uniformly over the road surface.

Before consolidating the soil more water is added, if necessary, to insure that the optimum moisture content required to obtain the maximum density of the soil mixture is present to facilitate compaction of the treated soil.

After the application of the tar and powdered pitch the mixture is consolidated by means of a roller. The resulting base course, surfacing course or pavement may be sprayed with coal tar or water gas tar to form a waterproof layer at the top of the stabilized soil preventing surface water from entering into the stabilized foundation. A pavement may subsequently be constructed over such a stabilized soil base course.

To demonstrate the improvements accomplished by the present invention there are given below comparative data on the testing of samples of soils stabilized in accordance with the present invention, i. e., by the addition of coal tar or water gas tar and a limited controlled amount of powdered pitch having a melting point of from 225° F. to 325° F., and by the addition of Portland cement which is being advocated for use as a soil stabilizing medium. Two types of soils were used in these tests, analyses of which were as follows:

|  | Soil Type 1 | Soil Type 2 |
| --- | --- | --- |
| Passing No. 10 sieve | 100% | 100% |
| Sand | 58 | 3 |
| Silt | 27 | 66 |
| Total clay | 15 | 31 |
| Colloidal clay | 4 | 8 |
| Soil texture | Sandy loam | Silty clay |

In all the following tests the tar used had a specific gravity of 1.16 at 25°/25° C., and a specific viscosity Engler, of 27.6 at 40° C. The powdered pitch used was the preferred pitch, the specifications of which are given hereinabove.

In all cases test soil specimens were prepared as follows:

Air-dried soil was prepared for mixtures by passing it through a No. 10 sieve. Portland cement or pulverized pitch was mixed in the selected proportions with the prepared soil, and then the optimum percentage of moisture was incorporated in the mixture. Specimens two inches in diameter and about one inch high were prepared from the moist mixture by a standardized hand-tamping procedure previously determined to produce a density of the compacted soil at least equal to that of the specimen processed in accordance with A. S. T. M. method D-698-42T. Specimens containing Portland cement were then cured for 7 days in a moist chamber and subsequently dried for 41 hours in an oven maintained at 60° C. Specimens containing tar, or tar plus pulverized pitch, were dried for 41 hours in an oven maintained at 60° C. Specimens containing neither Portland cement nor tar were also dried for 41 hours in an oven maintained at 60° C.

The percentage of water incorporated in each mixture was that percentage which would result in the highest density by the standardized compaction procedure. This percentage was determined in the customary manner by preparing series of specimens containing varying but known percentages of moisture, drying the specimens as described above, determining the density of specimens, and from a plot of density against percentage of moisture, selecting that percentage of moisture which resulted in the highest density. Such determinations were made for the soil, a mixture of the soil plus 6% of Portland cement, and a mixture of the soil plus 6% of tar. Percentages of optimum moisture for mixtures other than these were calculated by the appropriate proportioning method.

The per cent moisture absorption values were determined as follows:

The dried specimens were weighed and placed on sheets of filter paper laid on a level perforated brass plate enclosed in a cabinet. The depth of water in the tray of the cabinet was adjusted to the upper surface of the brass plate and maintained at that height by means of a constant level device. The specimens were thus subjected to the action of capillary moisture for a period of 14 days, after which they were removed from the cabinet and weighed. The percentage of moisture absorbed by each specimen was calculated on the basis of weight of the dry specimen, averaging the results from tests on at least two specimens.

The stability values were determined in accordance with the following test procedure:

The specimens subjected to the moisture absorption test, immediately after weighing, were inserted in a testing cylinder having an internal diameter of $2\frac{1}{16}$ inches, at the bottom of which was fitted an orifice plate with an annular opening $1\frac{1}{8}$ inches in diameter having a shearing edge $\frac{1}{16}$ inch in height. Load was applied to the specimen through a plunger with a horizontal face one inch in diameter, centrally located on the specimen by means of a cylindrical sleeve fitting inside the testing cylinder. This assembly was placed on the platform of a compression testing machine and a shearing load applied to the specimen such that the plunger descended at the rate of one inch per minute. The maximum load, in pounds, applied to cause failure of the specimen was recorded as the stability, averaging the results of tests on at least two specimens.

TABLE 1

*Comparative data on Type 1 soil stabilized with Portland cement and in accordance with present invention involving use of tar plus a limited controlled amount of powdered pitch*

PART A.—PORTLAND CEMENT STABILIZED SOIL

| Amount Portland Cement— Per Cent Weight Dry Soil | Per Cent Moisture Absorbed | Stability, lbs. Total Load |
|---|---|---|
| 0 | 22.7 | Too soft to test |
| 2 | 13.9 | 47 |
| 4 | 14.6 | 61 |
| 6 | 14.7 | 77 |
| 8 | 14.9 | 104 |

PART B.—SOIL STABILIZED IN ACCORDANCE WITH PRESENT INVENTION

| Varying Indicated Percentages[1] | Per Cent Moisture Absorbed | Stability, lbs. Total Load |
|---|---|---|
| 0.0 | 1.6 | 91 |
| 0.6 | 1.9 | 119 |
| 1.2 | 1.5 | 133 |
| 1.8 | 2.0 | 134 |
| 2.4 | 1.7 | 165 |
| 3.0 | 2.2 | 182 |

[1] Based on the weight of dry soil of powdered pitch added to soil containing 6% tar based on the weight of soil.

The surprising improvement in stability of stabilized soil effected by my invention is evident from the above data. Thus, the incorporation of 2.4% powdered pitch in Type 1 soil stabilized by the addition of 6% tar by weight of the soil results in an increase of stability of such soil of from 91 to 165, i. e., an increase of over 81%. As compared with the use of Portland cement as a soil stabilizing agent, my invention has the advantage it results in a stabilized soil which is much more resistant to absorption of moisture. It will be noted from the above data that powdered pitch does not have any material effect on the water-absorption properties of the stabilized Type 1 soil, and that Type 1 soil stabilized in accordance with the present invention has approximately one-seventh of the tendency to absorb moisture as such soil containing Portland cement, i. e., Type 1 soil stabilized with Portland cement, according to the test data hereinabove given, will absorb seven times as much water as soil stabilized in accordance with the present invention. It will be further noted that the moisture-absorption properties of Type 1 soil stabilized in accordance with the present invention are substantially the same as such soils stabilized by the use of tar alone; in the case of specimens of Type 1 soil containing 2.4% powdered pitch based on the weight of dry soil in addition to 6% tar, the moisture absorption value is 1.7 as compared with 1.6 for the same soil stabilized with 6% tar based on the weight of the soil.

TABLE 2

*Comparative data on Type 2 soil stabilized with Portland cement and in accordance with the present invention involving use of tar plus a limited controlled amount of pitch. The test procedure in developing the data hereinbelow given is the same as that used in developing the data included in Table 1 above*

PART A.—PORTLAND CEMENT STABILIZED SOIL

| Amount Portland Cement— Per Cent Weight Dry Soil | Per Cent Moisture Absorbed | Stability, lbs. Total Load |
|---|---|---|
| 0 | 39.1 | Too soft to test |
| 2 | 33.1 | 12 |
| 4 | 29.4 | 16 |
| 6 | 29.4 | 36 |
| 8 | 26.5 | 80 |

PART B.—SOIL STABILIZED IN ACCORDANCE WITH PRESENT INVENTION

| Varying Indicated Percentages[1] | Per Cent Moisture Absorbed | Stability, lbs. Total Load |
|---|---|---|
| 0.0 | 8.4 | 51 |
| 0.6 | 8.2 | 57 |
| 1.2 | 8.2 | 55 |
| 1.8 | 7.9 | 59 |
| 2.4 | 7.7 | 69 |
| 3.0 | 7.7 | 73 |

[1] Based on the weight of dry soil of powdered pitch added to soil containing 6% tar based on the weight of soil.

In the case of Type 2 soil, in general the results and improvements are comparable to those noted above in connection with Type 1 soil. Type 2 soil stabilized in accordance with my invention has a tendency to absorb about one-fourth as much water as such soil stabilized with Portland cement. Further, such soil stabilized in accordance with this invention has a somewhat smaller tendency to absorb water than, and is of substantially improved stability as, the same soil stabilized with tar alone. Moreover, the stability of the soil containing up to 3% powdered pitch is substantially greater than the same soil containing 6% Portland cement.

While the explanation for the surprising improvement in the stability of roads effected by this invention is not known, it is believed that the powdered pitch partially goes into solution or blends with the tar and this action progresses with time and with heating to moderate temperatures such as prevail periodically on a highway in service increasing the stability of the highway and maintaining the highway in a stable condition for long periods of time in use.

The term "road" is used in the sense defined in the Funk and Wagnall's New Standard Dictionary, 1931, to mean any "track," "passage," or "way" over which persons, vehicles or animals may pass from place to place, and includes roadways, foot paths, air fields, play grounds, parking areas, etc.

Since certain changes in carrying out the above process, and certain modifications in the composition which embody the invention may be made without departing from its scope, it is intended that all matter contained in the above description shall be interpreted as illustrative and not in a limiting sense.

What is claimed is:

1. The method of preparing a road comprising loosening soil along the course of the road to the desired depth, pulverizing the loosened soil, mixing a hard powdered pitch from the group consisting of coal tar pitch and water gas tar pitch, said pitch having a melting point of from 200° to 430° F. and liquid tar having a consistency within the range represented by a specific viscosity Engler of about 5 at 40° C. and a float test of 200 seconds at 32° C. with the pulverized soil in the proportions of from 2% to 10% liquid tar based on the weight of the soil and from 10% to 100% powdered pitch based on the weight of the tar and compacting the soil-pitch-tar mixture to provide a stabilized base course.

2. The method of preparing a road as defined in claim 1, in which the powdered pitch is a coal tar pitch having a melting point of from 225° to 325° F. and the liquid tar is a coal tar.

3. The method of preparing a road as defined in claim 1, in which the powdered pitch is admixed with an earthy material to maintain the pitch in readily dispersible condition.

4. The method of preparing a road as defined in claim 1, in which the powdered pitch is admixed with from 5% to 50% of earthy material to maintain the pitch in readily dispersible condition.

5. A stabilized soil road in which the individual particles of the soil are bound together by the clay constituents of the soil, said soil containing admixed therewith liquid tar having a consistency within the range represented by a specific viscosity Engler of about 5 at 40° C. and a float test of 200 seconds at 32° C. and powdered pitch from the group consisting of coal tar pitch and water gas tar pitch, said pitch having a melting point of from 200° to 430° F. in the proportions of from 2% to 10% liquid tar based on the weight of the soil and from 10% to 100% of powdered pitch based on the weight of the tar, said liquid tar and powdered pitch rendering the soil resistant to the absorption of water and to displacement under conditions of use.

6. A stabilized soil road as defined in claim 5, in which the liquid tar is coal tar and the powdered pitch is a powdered coal tar pitch having a melting point of from 225° to 325° F.

7. The method of preparing a road comprising loosening the soil along the course of the road, pulverizing the loosened soil, bringing the moisture content of the soil to the optimum moisture content required to obtain the maximum density of the soil mixture, mixing liquid tar having a consistency within the range represented by a specific viscosity Engler of about 5 at 40° C. and a float test of 200 seconds at 32° C. and powdered pitch from the group consisting of coal tar pitch and water gas tar pitch, said pitch having a melting point of from 225° to 325° F. with the soil, said pitch having the following screen analysis: passing a No. 10 sieve 100%, passing a No. 40 sieve not less than 75%, passing a No. 200 sieve not less than 30%, the amount of tar and powdered pitch thus added being from 2% to 10% tar based on the weight of the soil and from 10% to 100% powdered pitch based on the weight of the tar, and compacting the soil-pitch-tar mixture to provide a stabilized base.

8. A stabilized soil road in which the individual particles of the soil are bound together by the clay constituents of the soil, said soil containing admixed therewith from 2% to 10% tar based on the weight of the soil, said tar having a consistency within the range represented by a specific viscosity Engler of about 5 at 40° C. and a float test of 200 seconds at 32° C. and from 10% to 100% powdered pitch based on the weight of the tar, said pitch being from the group consisting of coal tar pitch and water gas tar pitch and having a particle size such that 100% passes a No. 10 sieve and not less than 20% passes a No. 200 sieve and a melting point of from 200° to 430° F.

9. A stabilized soil road in which the individual particles of the soil are bound together by the clay constituents of the soil, said soil containing admixed therewith from 2% to 10% tar based on the weight of the soil, said tar having a consistency within the range represented by a specific viscosity Engler of about 5 at 40° C. and a float test of 200 seconds at 32° C. and from 10% to 100% powdered pitch based on the weight of the tar, said pitch being from the group consisting of coal tar pitch and water gas tar pitch and having a particle size such that at least 100% passes a No. 10 sieve and not less than 30% passes a No. 200 sieve and a melting point within the range of from 225° to 325° F.

GEORGE E. MARTIN.

REFERENCES CITED

The following references are of record in the file of this patent:

UNITED STATES PATENTS

| Number | Name | Date |
|---|---|---|
| 1,628,679 | Neath | May 27, 1927 |
| 2,171,153 | Warden | Aug. 29, 1939 |
| 2,297,063 | McKesson et al. | Sept. 29, 1942 |
| 2,330,747 | Roediger | Sept. 28, 1943 |
| 2,355,242 | Roediger | Aug. 8, 1943 |
| 2,407,470 | Blott et al. | Sept. 10, 1946 |

FOREIGN PATENTS

| Number | Country | Date |
|---|---|---|
| 523,458 | Great Britain | July 15, 1940 |

OTHER REFERENCES

Proceedings of the Association of Asphalt Paving Technologists, vol. 14 (1942), pages 225–234.